United States Patent [19]

Yang

[11] Patent Number: 4,825,827

[45] Date of Patent: May 2, 1989

[54] SHAFT POWER GENERATOR

[76] Inventor: Ki W. Yang, 148-202, Chugong Apt., Sanbon-ri, Kunpo-eup, Kyeungki-do, 171-00, Rep. of Korea

[21] Appl. No.: 79,777

[22] PCT Filed: Jun. 28, 1986

[86] PCT No.: PCT/KR86/00013
§ 371 Date: Jun. 25, 1987
§ 102(e) Date: Jun. 25, 1987

[87] PCT Pub. No.: WO87/01414
PCT Pub. Date: Mar. 12, 1987

[30] Foreign Application Priority Data

Aug. 26, 1985 [KR] Rep. of Korea ............ 1985/6145[U]

[51] Int. Cl.$^4$ .............................................. F02B 53/00
[52] U.S. Cl. ...................................... 123/249; 123/238
[58] Field of Search ............... 123/204, 213, 215, 238, 123/249

[56] References Cited

U.S. PATENT DOCUMENTS 3,214,907 11/1965 Martin .............................. 60/39.161
3,724,427 4/1973 Sauder .............................. 123/215 X

FOREIGN PATENT DOCUMENTS 1776046 9/1971 Fed. Rep. of Germany .
2636024 3/1978 Fed. Rep. of Germany .

Primary Examiner—Stephen F. Husar
Attorney, Agent, or Firm—Michael N. Meller

[57] ABSTRACT

A rotary combustion engine has two segregated chambers which communicate with each other via passageways. Combustion occurs in the first chamber and expansion occurs in the second chamber. Each chamber includes two sidewise abutting cylinder lobes with a piston-like rotor and a cylindrical hub being rotatably mounted in each cylinder lobe. Compressed gas is ignited in the first chamber in a constant volume, the ignited gas then flows into the second chamber, where it expands, and thereafter the expanded gas is discharged under constant pressure.

4 Claims, 4 Drawing Sheets

SHAFT POWER GENERATOR

TECHNICAL FIELD

This invention relates to a rotary-type heat engine for the generation of shaft power. In detail, this invention relates to compression, combustion and expansion processes that belong to the basic principle of operation of a heat engine.

In this invention, these processes are performed in each independent working chamber, in contrast to a Reciprocating Piston Engine. The expansion system of this invention can also be separate from the compression system, so this invention can be applied to not only a Diesel Engine System or Gasoline Engine System but also to a Gas Turbine System or Steam Turbine System.

BACKGROUND ART

A Diesel Engine has the advantage of high thermal efficiency due to operating at high temperature, but it has also the disadvantages of heavy weight, reciprocating unbalance, too much energy loss exhausted to atmosphere, etc.

In the Reciprocating Piston Engine and the Wankel Rotary Engine, there are available pressure gases, not fully expanded in their working chamber at the end of the expansion stroke, and then these pressure gases are exhausted to atmosphere at the next exhaust stroke.

A Gas Turbine has the advantages of low weight, no reciprocating unbalance, continuous power generation, etc., but because it operates at comparatively low temperature, it has also the disadvantage of low thermal efficiency.

The following is a brief description of the Circumferential Piston Pump, a kind of rotary pump, related to this invention.

The pistonlike rotor elements, supported from cylindrical hubs inset into the pump end plate, travel in circular paths in mating body bores. The rotors do not mesh or touch, and fluid seals exist only between rotor and stator surfaces, and not between rotors. It is characteristic of a circumferential piston pump that the rotors do not mesh with, or contact, each other. This is distinguished from lobe, gear, and screw pumps. The radial surfaces and axial-end surfaces of the rotor-piston elements run in clearance contact with the body wall. And load-bearing cotact may exist in these zones. Each rotor in a Circumferential Piston Pump feels the full pumping torque alternatively.

This pump operates at a high compression efficiency under a low compression ratio, and yet it has low compression efficiency under compression ratios higher than "1:2", because high pressure gases compressed by one rotor backflow instantaneously into the pumping chamber of the other rotor which just starts compressing low pressure gases, so the kinetic energy related to backflowing of gases increases the entropy of gases.

DISCLOSURE OF INVENTION

The object of this invention is to provide a Rotary-Type Heat Engine having the following advantages: high thermal efficiency, no crank, no valve, no reciprocating unbalance, simple and fewer components.

This object is achieved by the device according to the invention having the characterizing features set forth in the accompanying claims.

The basic structure for the device in accordance with this invention, consisting of 2-stage working chambers, is the same structure as if two Circumferential Piston Pumps (one is small and the other is large) are combined closely in series, that is, one pump consists of 2-stage pumping chambers with two pairs of Circumferential Pistonlike Rotors.

Herein the device related to this invention is characterized in that one of two working chambers combined closely in series is small in size and the other is large in size. And the details are as follows.

Each working chamber having a pair of circumferential pistonlike rotors is connected to the other by a comparatively small gas-passageway. The pistonlike rotors, supported from cylindrical hubs, travel in circular paths in mating body bores. And there is a certain phase-angle of the small pistonlike rotor relative to the large one, and all the pistonlike rotors in the working chambers are rotated at the same rotation speed by timing gears.

This invention like a 2-stage Circumferential Piston Pump has the function of compression and expansion generally required in a Heat Engine as follows.

In the case of a Compressor, the port of the Large Working Chamber is the inlet, and the port of the Small Working Chamber is the outlet of the working fluid (air). Now suppose that the pressure of the air flowing into the inlet is atmospheric pressure. Then air is transferred into the Large Working Chamber by the rotating Large Pistonlike Rotor (LPR) and is compressed by the rotating LPR to a pressure which is determined by the size of the large and small working chambers.

After completing the compression by one LPR, the Small Pistonlike Rotor (SPR) isolates the compressed air from the Large Working Chamber and prevents the compressed air from backflowing toward the Large Working Chamber in which the other LPR starts compressing the atmospheric pressure air newly entered. And then the SPR transfers the compressed air to the outlet. This processing repeats periodically so that compressed air can be obtained continuously.

On the other hand, if the phase-angle of the SPR relative to the LPR is wrongly set, the SPR cannot isolate the compressed air from the Large Working Chamber. Therefore, the compressed air backflows into the Large Working Chamber in which the LPR starts compressing atmospheric pressure air. Thus the kinetic energy of air related to backflowing is finally changed to heat energy, so that the air entropy increases, and then this entropy-increase causes a rapid decline in the compression efficiency.

In the case of the Shaft Power Generator, the inlet is the port of the Small Working Chamber, and the outlet is the port of the Large Working Chamber. The Small Working Chamber is equipped with Fuel Injection Nozzles such as those of a Diesel Engine (or Spark Plug such as that of a Gasoline Engine), which are symmetrically located at the outside wall.

Now suppose that air of high pressure/temperature (approx. 3 MPa, 570° C.) flows into the inlet of the Small Working Chamber. (When atm. air is adiabatically compressed under the compression ratio "1:10" and with an efficiency of 85%, the pressure and the temperature of air at the outlet of the compressor are approx. 3 MPa and 570° C.)

Then the air is continuously transferred toward the Large Working Chamber by rotating SPRs. By the way, the fuel is alternatively injected into the Small Working Chamber as in a Diesel Engine the fuel is injected into the cylinder at the end of the compression stroke in an atomized form. And then the injected fuel is immediately ignited/burned in the Small Working Chamber. Thus, the super pressure/temperature gases are generated in the Small Working Chamber by the combustion of the fuel injected.

Next, the superpressure gases flow alternatively into the Large Working Chamber, via the Gas-Passageway. And then, the superpressure gases make the LPR rotate, expanding adiabatically to atmospheric pressure in the Large Working Chamber.

In detail, after the gases in the Large Working Chamber expand fully and are automatically isolated from the GasPassageway by the rotating LPR to complete the generation of shaft power, the new superpressure gases are timely supplied into the Large Working Chamber and expand their again. And the gases which are already supplied and expand fully are transferred to the outlet by the rotating LPR, that is, the exhaust process of gases is performed without valves.

Therefore, the shaft power corresponding to the difference of enthalpies between the superpressure gases and the exhaust gases is continuously generated from the alternative expansion of gases by one LPR and the other LPR.

On the other hand, if the phase-angle of the SPR relative to the LPR is wrongly set, the superpressure gases flow untimely into the Large Working Chamber in which the previously entered gases are expanding. And then, the superpressure gases are mixed with the gases already entered. Next, these gases having available pressure, not yet expanded in the Large Working Chamber, are exhausted, so that explosion noises instead of shaft power are generated by the available pressure exhausted.

Briefly, when two circumferential piston pumps—one is a small pump and the other is a large one—are combined closely in series and the pistonlike rotors are rotated at the same rotation speed, and when there is a certain phase-angle of a small rotor relative to a large one so that high pressure gases, for example in the case of a shaft power generator, can be timely supplied from the small working chamber to the large working chamber just after the gases in the large working chamber finish the expansion process and begin the exhaust process, without any valves and cranks the device of this invention, using the structure of the circumferential piston pump which is only a rotary pump, can successfully accomplish the compression process, the combustion process, the expansion process and the exhaust process required in an internal combustion engine.

This invention can also achieve these processes simultaneously not by two stages including a small working chamber and a large one but by three stages including a compression working chamber (medium size), a combustion working chamber (small size) and an expansion working chamber (large size). Obviously the three pairs of pistonlike rotors should rotate at the same rotation speed.

In this case, the air that has flowed into the Compression Working Chamber is adiabatically compressed by the rotating Medium Pistonlike Rotor and is automatically moved into the Combustion Working Chamber as previously described during the compression process.

Next, the superpressure gases are generated in the Combustion Working Chamber by combustion of the injected fuel and are automatically and timely supplied into the Expansion Working Chamber. And then these superpressure gases expand in the Expansion Working Chamber as previously described during the combustion process and the expansion process. Thus shaft power is generated, and then the gases fully expanded in the Expansion Working Chamber are exhausted to the atmosphere. These processes are performed continuously by three pairs (total 6) of Pistonlike Rotors rotating at the same rotation speed.

In this invention, since the Compression Chamber, Combustion Chamber and Expansion Chamber are respectively separated differently than the chambers in a Reciprocating Piston Engine, the Combustion Process can be performed under constant volume, while the Exhaust Process can be performed under constant pressure, in other words, heat is added by combustion of fuel in the compressed air of the Constant Volume of the Combustion Working Chamber isolated from the Expansion Working Chamber by SPRs, and the Exhaust Pressure can fall to atmospheric pressure by designing the optimum size of each working chamber so that the rejection heat can be minimized, namely, the Exhaust Process of Constant—Pressure Rejection of Heat can be achieved.

Therefore, the theoretical thermal efficiency for this invention may be higher than that for Carnot Cycle Systems because of the Combustion Process in Constant-Volume Addition of Heat and the Exhaust Process in Constant-Pressure Rejection of Heat.

SYMBOLS AND LEGEND USED IN THIS DRAWINGS

1 Small Pistonlike Rotor
2 Large Pistonlike Rotor
3 Small Working Chamber
4 Large Working Chamber
5 Cylindrical Hub of Small Rotor
6 Cylindrical Hub of Large Rotor
7 Inlet in case of Shaft Power Generator or Outlet in case of Compressor
8 Gas-Passageway
9 Outlet in case of Shaft Power Generator or Inlet in case of Compressor
10-17 Cooling Passageways
18 Fuel Injection Nozzle or Spark Plug
19 Pressure Monitoring Nozzle
  A Centrifugal Compressor
  B Invention Compressor C Ignition Burner
D Invention Shaft Power Generator operating at high pressure
E Heater
F Invention Shaft Power Generator operating at low pressure
G Electrical Power Generator
H Condenser
I Condensate Pump
J Deaerator
K Heater Feed Pump
L Fuel Injection Pump
M Ignition Rotary Pump
N Fuel Storage Tank

BEST MODE FOR CARRYING OUT THE INVENTION

Figure 8:
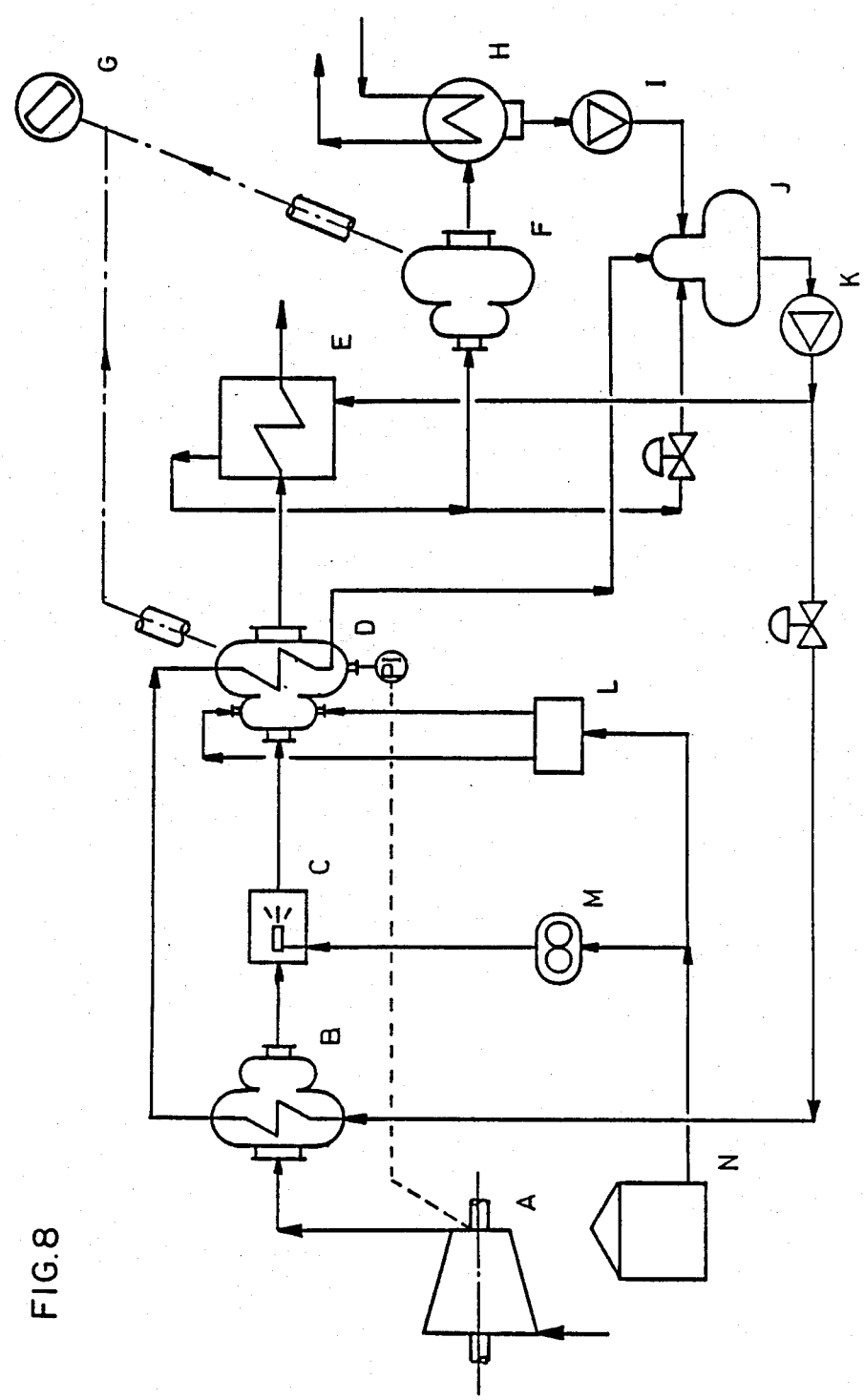
FIG. 8 is a flow diagram for a power generation plant to explain the process for generating shaft power in accordance with the invention.

FIG. 8 is a flow diagram for a power generation plant which explains the process of generating shaft power by this invention including Compressor B, Shaft Power Generator D with Fuel Injection Nozzle 18 and another Shaft Power Generator F without Fuel Injection Nozzle. The drawing of the 3-stage embodiment of the invention is not illustrated because the function of this is partially shown in FIG. 1 and 8. Suppose that Compressor B is directly connected with Shaft Power Generator D.

Figure 1:
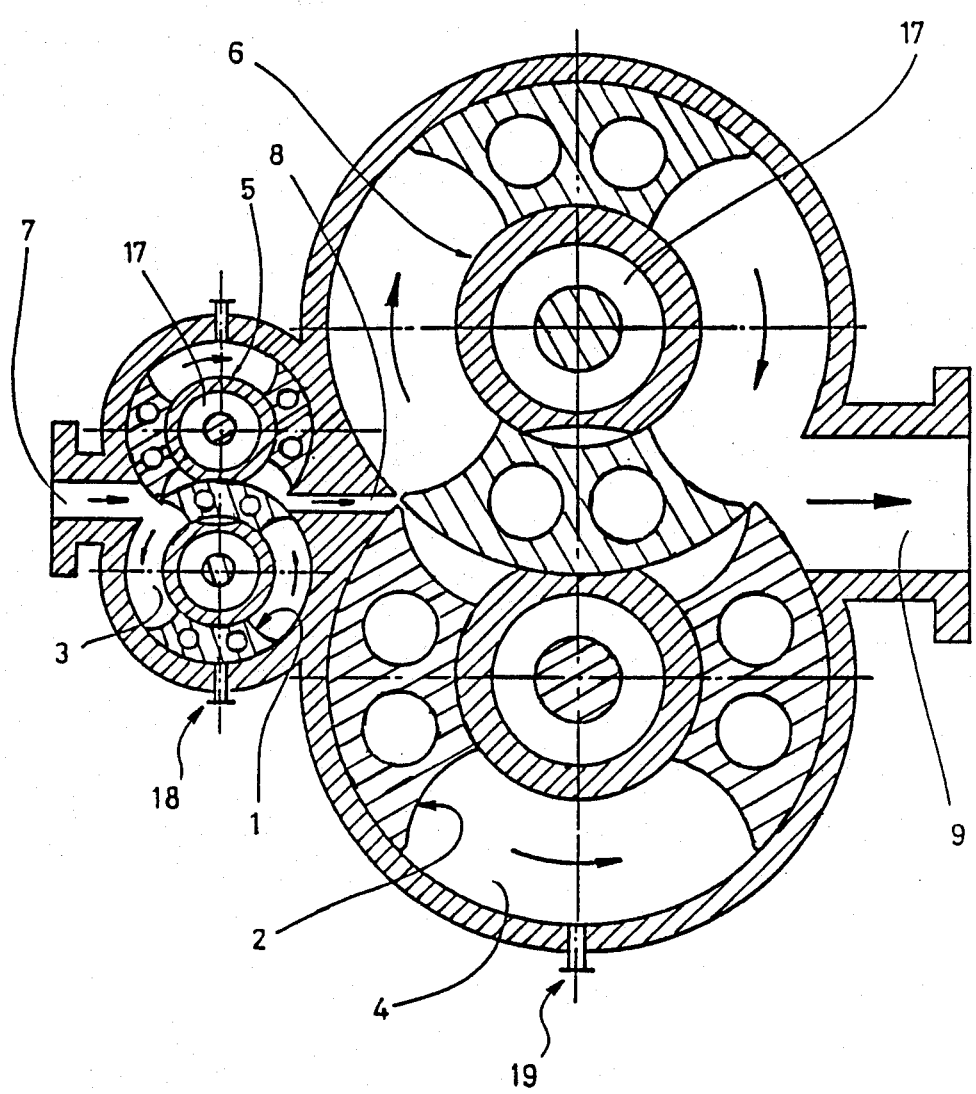
FIG. 1 is a schematic section of the embodiment of a device according to this invention.
Figure 2A:
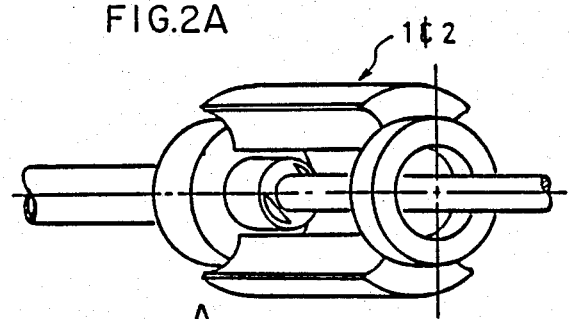
FIG. 2 shows typical details of the Pistonlike Rotor according to FIG. 1.
Figure 2B:
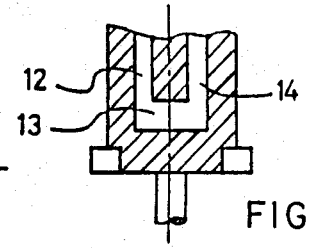
Figure 2C:
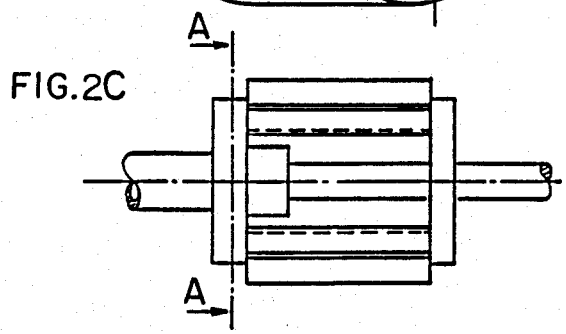
Figure 2D:
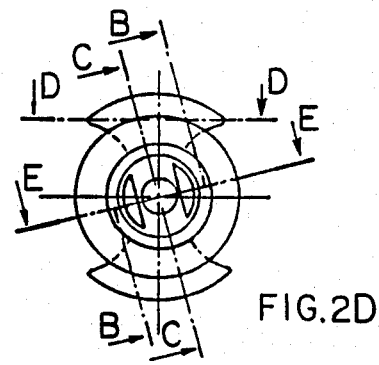
Figure 2E:
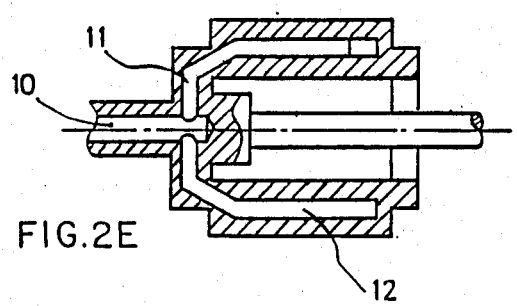
Figure 2F:
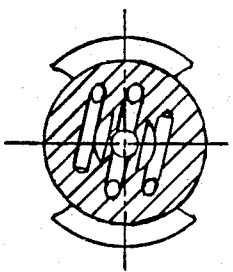
Figure 2G:
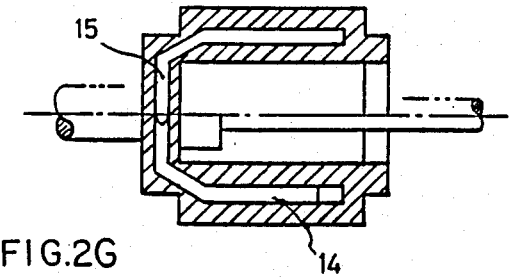
Figure 2H:
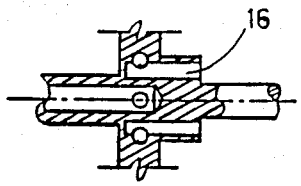
Figure 3A:
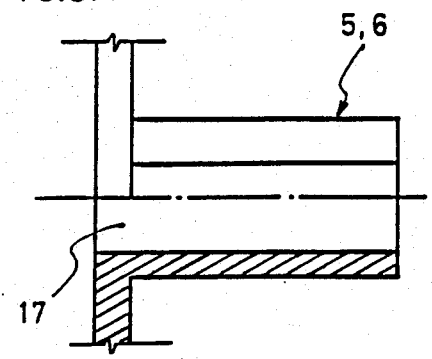
FIG. 3 shows typical details of the Cylindrical Hub according to FIG. 1.
Figure 3B:
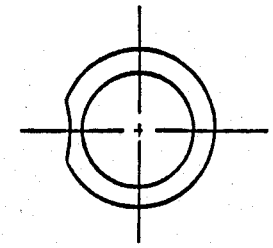

FIG. 1 illustrates the typical structure of the 2-stage embodiment of this invention.

Pistonlike Rotors (1,2), supported on the Cylindrical Hubs (5,6), travel in circular paths in mating body bores. The Pistonlike Rotors neither mesh with nor contact each other, and run in close-clearance contact with the body walls. These Rotors have Cooling Water Passageways (10-17) illustrated in FIG. 2 in order to run at high temperature. All the rootrs rotate at the same rotation speed by timing gears (not shown).

The following explains the process of shaft power generation for this invention.

After atmospheric air is firstly compressed by Centrifugal Compressor A, the compressed air is secondarily recompressed to approx. 3 MPa by Compressor B illustrated in FIG. 8. Now suppose that the total compression efficiency of Centrifugal Compressor A and Compressor B is 85% and that the total compression ratio is "1:10". And so the temperature of the compressed air at the outlet of Compressor B is approx. 570° C. The compression process of Compressor B is as follows; The air that has flowed into Large Compression Chamber 4 is adiabatically compressed by rotating Large Pistonlike Rotors 2, and then the air is timely moved to outlet 7 by rotating Small Pistonlike Rotors 1 which prevent the compressed air from backflowing into the Large Compression Chamber.

Next, this high pressure air flows from Outlet 7 of Compressor B into Small Combustion Chamber 3 of Shaft Power Generator D via Ignition Burner C and then is transferred to Large Expansion Chamber 4 by rotating Small Pistonlike Rotors of Shaft Power Generator D.

By the way, fuel which is pumped by Fuel Injection Pump L at superpressure injects alternatingly and timely into Small Combustion Chamber 3 in an atomized form by means of Fuel Injection Nozzle 18, so that the fuel can be immediately ignited/burned in the Small Combustion Chamber like he combustion process of a Diesel Engine. Thus combustion gases having superpressure are obtained from the Small Working Chamber.

When Shaft Power Generator D starts operation, Ignition Rotary Pump M is operated to supply the fuel to Ignition Burner C which has the function to make the temperature of the air transferred from Compressor B to Shaft Power Generator D rise to the higher temperature so that the fuel injected into Small Combustion Chamber 3 may be easily ignited. (Maybe Rotary Pump M and Burner C will not be required in this system.)

The superpressure gases generated in the Small Combustion Chamber are timely supplied to Large Expansion Chamber 4 of Shaft Power Generator D by rotating Small Pistonlike Rotor 1 just after completing the expansion of gases already supplied. And then the gases expand adiabatically to atmospheric pressure in the Large Expansion Chamber. Next, the expanded gases are exhausted to Outlet 9 of Shaft Power Generator D and the superpressure gases in the Small Combustion Chamber are supplied into the Large Expansion Chamber via gas passageway 8 again.

As a result of this, the shaft power equivalent to the difference of enthalpies between the superpressure gases and the exhaust gases is generated from the shafts of pistonlike rotors.

The description of these processes related to the cycle of thermodynamics is given as follows.

Figure 4:
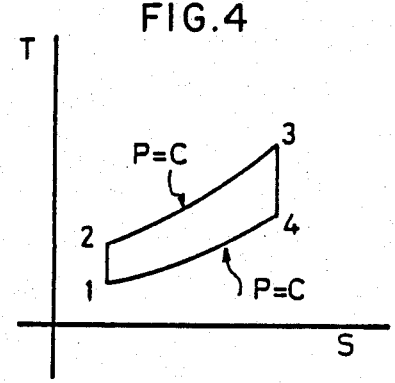
FIG. 4 is a temperature vs. entropy diagram of the Brayton Cycle.
Figure 5:
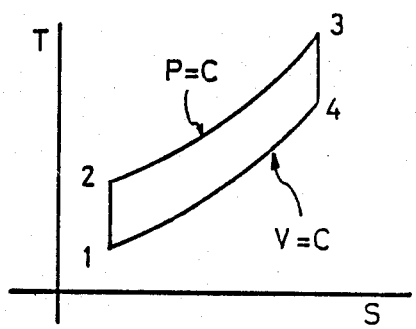
FIG. 5 is a temperature vs. entropy diagram of the Diesel Cycle.
Figure 6:
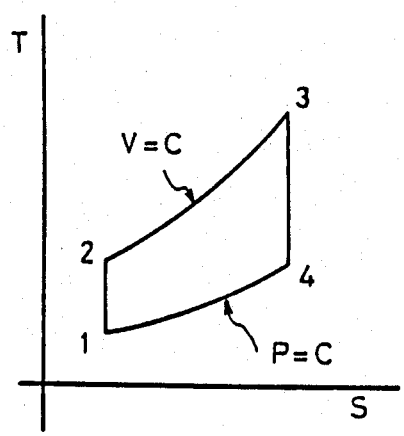
FIG. 6 is a temperature vs. entropy diagram of the cycle in accordance with the invention.

FIGS. 4, 5 and 6 are diagrams of the ideal cycles related to a Simple Gas Turbine, a Diesel Engine and the invention in order to show that the thermal efficiency of this invention is higher than that of any other engine.

In the ideal cycle of the invention, air at point 1 (atm.) is compressed isentropically to point 2 (the outlet of Compressor B in FIG. 8). Heat is then added by combustion of injected fuel in the compressed air in the Small Working Chamber, heating fluid to point 3 at Constant Volume, after which it expands isentropically from 3 to point 4 in Large Expansion Chamber 4 of Shaft Power Generator D. Exhaust from the outlet of Shaft Power Generator D to atmosphere is represented by the line of point 4 to 1, the constant-pressure rejection of heat.

In this cycle, part of the shaft power produced by Shaft Power Generator D from 3 to 4 is used to supply the power of compressors A and B, the remainder constituting the Net Power Output.

Figure 7:
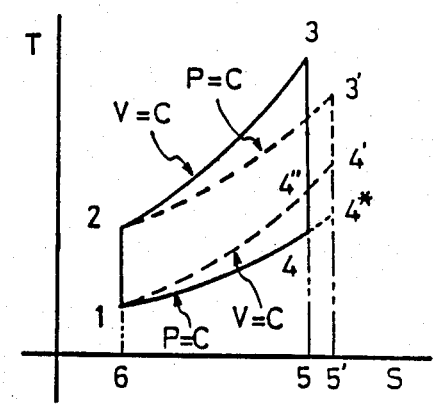
FIG. 7 is a diagram of the Invention Cycle, Brayton Cycle, Otto Cycle and Diesel Cycle which are plotted on the same temperature-entropy plane in order to compare their thermal efficiencies.

FIG. 7 shows that the thermal efficiency of the cycle according to the invention is thermodynamically superior to that of any other cycle of Heat Engine.

Now suppose that the Compression Ratio and Supplied Heat related to the Invention Cycle, Brayton Cycle, Otto Cycle and Diesel Cycle are constant. Then, their cycles illustrated in FIG. 7 on the same plane of temperature-entropy are as follows:

Invention Cycle : Line 1-2-3-4-1
Brayton Cycle : Line 1-2-3'-4 *-1
Otto Cycle : Line 1-2-3-4"-1
Diesel Cycle : Line 1-2-3'-4'-1

In FIG. 7, Supplied Heat related to every cycle is represented by the area 62356 or 623'5'6 being equal to each other, but the Exhausted Heat is represented by a different area as follows:

Invention Cycle : Area 61456 (Min.)
Brayton Cycle : Area 614*5'6
Otto Cycle : Area 614"56
Diesel Cycle : Area 614'5'6 (Max.)

Thus, in every cycle the Net Power Output is the difference between the heat supplied and the heat removed during the cycle, also represented by the area as follows:

Invention Cycle : Area 12341 (Max.)
Brayton Cycle : Area 123'4*1
Otto Cycle : Area 1234"1
Diesel Cycle : Area 123'4'1 (Min.)

The Thermal Efficiency of a cycle is defined as the heat equivalent of the work done divided by the total heat supplied. Therefore, the thermal efficiency of the Invention Cycle is the highest among the four cycles, and that of the Diesel Cycle is the lowest among them.

In general, the Heat Engine has a good thermal efficiency when it operates at high temperature. Thus, in an actual heat engine, the thermal efficiency of a Diesel Engine is rather higher than that of a Gasoline Engine or Gas Turbine because the Diesel Engine is operated at a high compression ratio, that is, it is operated at high pressure and temperature.

In this invention, there are some cooling passageways (10-17) in the Pistonlike Rotors as shown in FIG. 2. Thus, Compressor B and Shaft Power Generator D for example, can be readily cooled by cooling water which is circulated through the Cooling Passageways (10-17) by means of Heater Feed Pump K as symbolically shown in FIG. 8, so that the devices of this invention can be operated at high temperature like in a Gasoline Engine or Diesel Engine.

On the other hand, Shaft Power Generator D is operated with good efficiency when the pressure of the exhaust gases reaches atmospheric pressure.

The following description shows that the pressure of gases exhausted from Shaft Power Generator D can always maintain atmospheric pressure without regard to the change of load in Shaft Power Generator D.

The pressure of the exhaust gases in Shaft Power Generator D is detected by Pressure Monitoring Nozzle 19 shown in Fig 1. This monitored exhaust pressure is transformed into an electrical signal according to the difference from atmospheric pressure.

This electrical signal controls the rotation speed of Centrifugal Compressor A; if the exhaust pressure is higher than atmospheric pressure, the rotation speed of Compressor A becomes slow. Conversely, if the exhaust pressure is lower than atmospheric pressure, the rotation speed of Compressor A is fast. And then, as the change of the rotation speed of Compressor A brings about the change of the compression ratio, the air pressure flowing into Shaft Power Generator D is changed and also the Exhaust Gases Pressure is changed in proportion to the compression ratio. In FIG. 8 the dashed line linked from Pressure Monitoring Nozzle 19 of Shaft Power Generator D to Compressor A is an Electrical Signal Line to control the rotation speed of Compressor A.

Therefore, the exhaust Pressure in this invention is always kept at atmospheric pressure, so that not only does Shaft Power Generator D have a good thermal efficiency but also Exhaust Sound, which is produced at the outlet of a shaft power generator such as a Diesel Engine, may be eliminated.

Also this invention can be used for a shaft power generator of the regeneration system as shown in FIG. 8. In this case Shaft Power Generator F does not require the Fuel Injection Nozzle 18 equipped in the Small Working Chamber. This structure is the same structure as that of the Shaft Power Generator D illustrated in FIG. 1.

The function of the Shaft Power Generator F is similar to that of a Steam Turbine. But the process of producing shaft power from a high pressure steam is different from that of a Steam Turbine as follows.

Briefly, in the case of a Steam Turbine, the energy of the high pressure steam is transformed into kinetic energy by means of expansion through nozzles, and the kinetic energy of the resulting jet is in turn converted into shaft power. But in Shaft Power Generator F of the invention, the energy of the high pressure steam is directly converted into shaft power by means of adiabatic expansion in the Large Working Chamber without transformation into kinetic energy influenced by entropy increase of steam.

The following description shows that the heat exhausted from Shaft Power Generator D is transformed into shaft power by means of Shaft Power Generator F.

The heat exhausted from generator D produces pressure steam by heat exchange of Heater E which is a Heat-Pipe-Type Heat exchanger. A small quantity of this steam is transferred to Deaerator J in order to balance the temperature in Deaerator J, but most of it is supplied to generator F.

High pressure steam that has flowed into the Small Working Chamber 3 of genrator F is moved alternatingly into Large Working Chamber 4 by two small Pistonlike Rotors 1, and then this pressure steam expands adiabatically in the Large Working Chamber and is exhausted to Outlet 9 of Shaft Power Generator F.

Next, pressure steam is supplied again from the Small Working Chamber into the Large Working Chamber just after completing the Expansion Process of the gases already entered and starting the Exhaust Process in the Large Working Chamber.

These processes are continuously performed, and the shaft power for the difference of enthalpies of steam between the inlet and outlet of generator F is generated continuously.

The pressure of the steam exhausted from generator F becomes lower than atmospheric pressure. Probably it is lower than the pressure of the last stage of the turbine in a Steam Turbine System.

Next, little of the condensate pumped by Heater Feed Pump K is transferred to Compressor B for cooling of Compressor B and generator D and most of the rest is fed to Heater E again. And these processes are continuously performed.

This regeneration system is not indispensable to the present invention. It is only a regeneration system which shows that this invention has the same function as a Steam Turbine.

What is claimed:

1. A rotary engine comprising:
a combustion chamber formed by a first pair of communicating cylinder lobes of first radius, each cylinder lobe of said first pair having a cylindrical hub rotatably mounted therein and a gas transfer rotor mounted on said corresponding cylindrical hub, said combustion chamber having air inlet means, fuel injection means and combustion product outlet means;
an expansion chamber formed by a second pair of communicating cylinder lobes of second radius greater than said first radius, each cylinder lobe of said second pair having a cylindrical hub rotatably mounted therein and a power rotor mounted on said corresponding cylindrical hub, said expansion chamber having combustion product inlet means and combustion product outlet means, the axes of said rotatable cylindrical hubs of said expansion chamber being displaced from the axes of said rotatable cylindrical hubs of said combustion chamber; and passageway means for coupling said combustion product outlet means of said combustion chamber to said combustion product inlet means of said expansion chamber;

wherein said cylindrical hub and said rotor in each cylinder lobe of said chambers define only two pockets therein, said pockets being diametrally opposite to each other, the air and fuel mixture in the respective pockets of said combustion chamber being ignited in succession during different quarter-cycle intervals.

2. The rotary engine as defined in claim 1, wherein said fuel injection means are located to inject fuel into a pocket having constant volume during rotation of said corresponding rotor in said combustion chamber.

3. The rotary engine as defined in claim 1, wherein said combustion product inlet means of said expansion chamber are located to allow combustion product to initially a volume defined by a surface of the rotor in one cylinder lobe, a surface of the rotor in the other cylinder lobe and a surface of the cylindrical hub in said other cylinder lobe, said volume being substantially smaller than the constant volume of a pocket in said expansion chamber.

4. A rotary engine comprising a combustion chamber formed by two partially overlapped cylindrical chambers provided respectively with cylindrical hubs at respective centers thereof, and an expansion chamber having the identical shape as said combustion chamber but having greater size, said combustion chamber and said expansion chamber being arranged adjacent to each other and communicating via gas transfer passageway means, said cylindrical hubs of said combustion chamber each having a gas transfer rotor mounted thereon, each gas transfer rotor forming a pair of combustion pockets in said combustion chamber, and said cylindrical hubs of said expansion chamber each having a power rotor mounted thereon, each power rotor forming a pair of expansion pockets in said expansion chamber, each cylindrical chamber of said combustion chamber having at least one fuel injection nozzle, said rotors being rotated in a timed and phased relationship whereby fuel is injected into a combustion pocket having a constant volume during rotation of said gas transfer rotors through a predetermined angle, combusted gases from said combustion pocket enter a deadspace between said power rotors in said expansion chamber of volume substantially less than the volume of said respective expansion pocket and are expanded into said volume of said respective expansion pocket, and said fully expanded combustion products are discharged under constant pressure into the atmosphere.

* * * * *